May 19, 1936.  H. M. SMALLEN  2,041,574
MARKING DEVICE
Filed Feb. 12, 1934  3 Sheets-Sheet 1
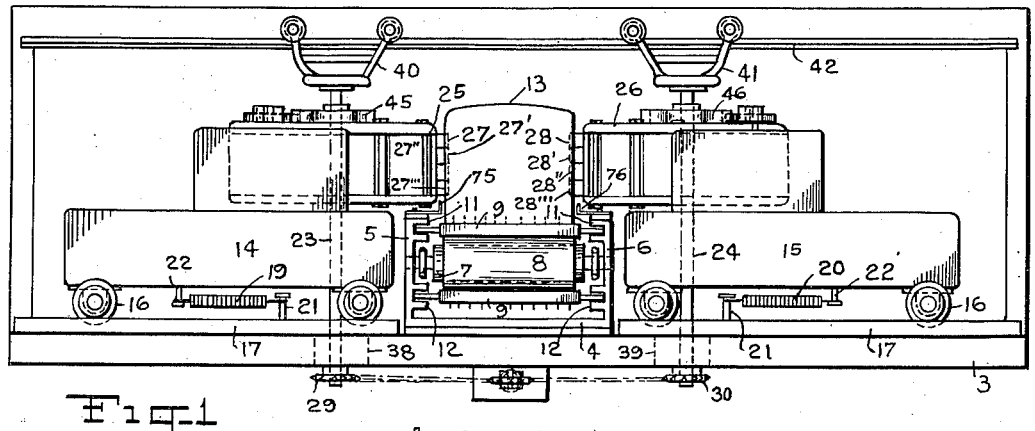
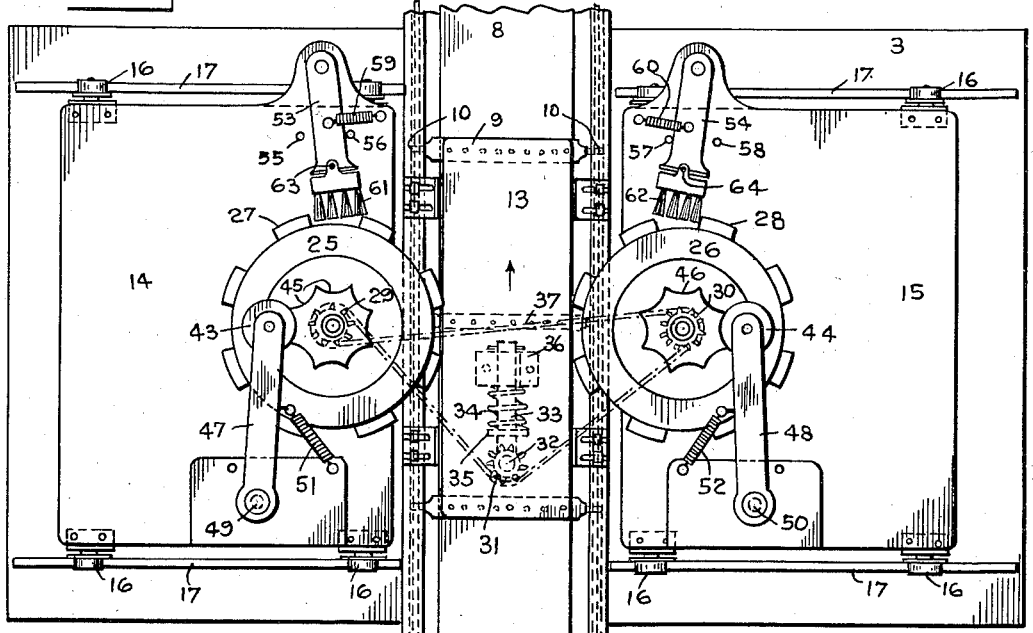
Harry M Smallen
INVENTOR
BY
ATTORNEY

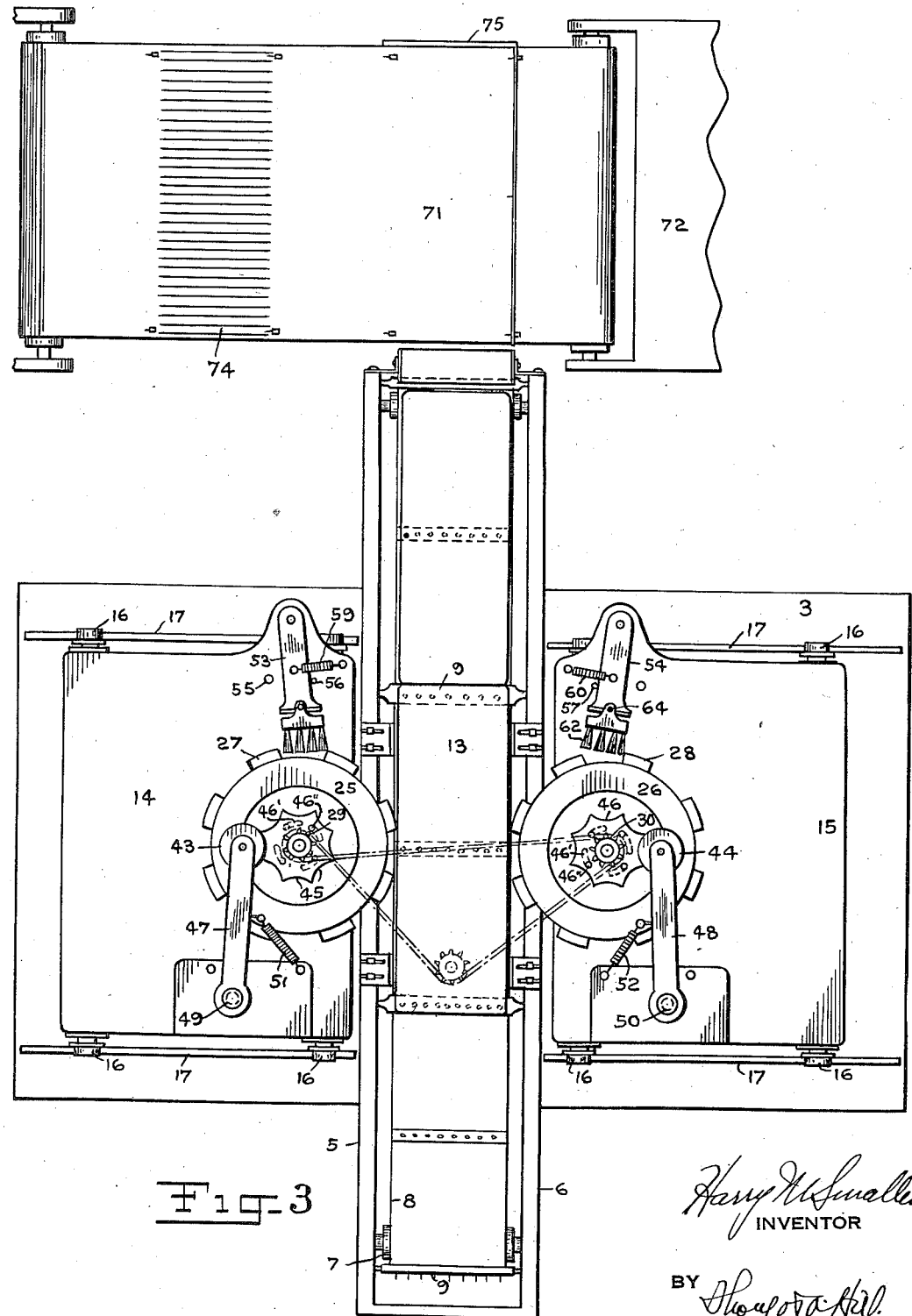

May 19, 1936.    H. M. SMALLEN    2,041,574
MARKING DEVICE
Filed Feb. 12, 1934    3 Sheets-Sheet 3

Patented May 19, 1936

2,041,574

UNITED STATES PATENT OFFICE 2,041,574

MARKING DEVICE

Harry M. Smallen, Brooklyn, N. Y.

Application February 12, 1934, Serial No. 710,861

2 Claims. (Cl. 101—36)

My invention relates to improvements in marking or branding machines and more particularly, has reference to and is illustrated in the accompanying drawings in its application to a machine of the class described, more especially adapted for applying a series or succession of marks or brands upon a loaf of bread, so that when the bread is sliced, each slice of bread is branded preferably on the crust and at opposite sides thereof, and the same is in the nature of an improvement upon my co-pending patent application S. N. 582,103.

Figure 4:
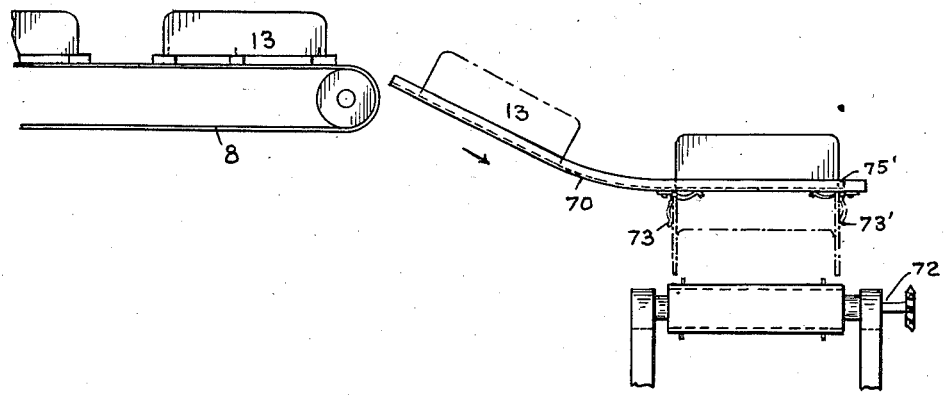
Figure 5:
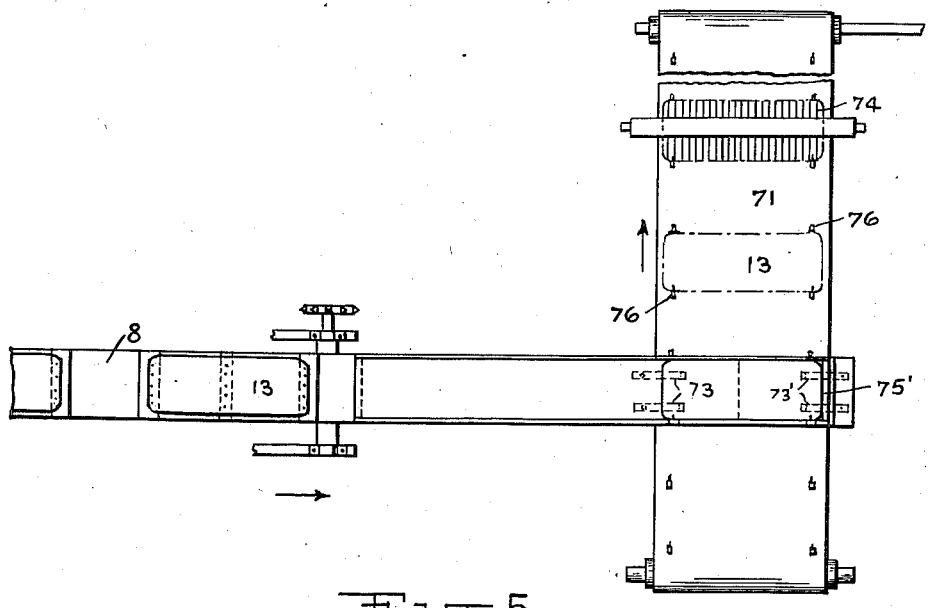

Referring to the accompanying drawings, I have illustrated in Fig. 1 in end elevation, a suitable form of device embodying an application of my invention. Fig. 2 is a plan view looking down upon Fig. 1, parts of the device being broken away. Fig. 3 is a plan view of the branding and slicing machine co-operatively driven for synchronous action upon the loaves of bread. Fig. 4 is a view in elevation of parts of the branding and slicing machine conveyors showing the transfer of loaves from the former to the latter, and Fig. 5 is a plan view thereof.

3 indicates a suitable platform or table upon which is mounted the conveyor frame 4, which may be provided with lateral walls 5, 6, in which may be mounted roller 7, for carrying the endless conveyor or belt 8 having guides 9 suitably secured thereto provided with pins 9' for holding the loaves in position thereon, said guides preferably having reduced ends 10 adapted to travel in the frame guides 11, 12, provided with top guides 75, 76, between which loaves of bread 13 may pass for branding in the manner hereinafter described.

14, 15 indicate carriages having wheels 16, adapted to ride upon rails 17, and are projected in the direction of each other by springs 19, 20, one end of each of which is anchored as indicated at 21 to the platform 3, and the other end of each of which is anchored as indicated at 22, to the carriages 14, 15 as shown.

Each of the carriages 14, 15 is provided with vertical rotatable shafts 23, 24, carrying branding wheels 25, 26, having branding dies or characters 27, 28, which may be heated by internally secured electrical resistance such as nichrome wire, as is well known in the art. Upon the lower ends of the shafts 23, 24, may be secured sprocket wheels 29, 30, and another sprocket wheel 31 may be mounted upon the shaft 32, secured upon the end of the slidable member 33, provided with a compression spring 34, between its collar 35 and bearing 36, a suitable sprocket chain 37 engaging the sprocket wheels as shown, suitable cut away portions 38, 39, being provided in the base or table 3, to allow for the lateral movement of the vertical shafts 23, 24, under influence of the springs 19, 20, as loaves of varying thickness or width pass between the dies, the sprocket wheel and chain hook-up insuring synchronous movement of the die wheels.

The upper ends of the shafts 23, 24 may be provided with trolley brackets 40, 41, adapted to ride upon the rail 42, thus further stabilizing, and securing in proper operative relation the die wheels 25, 26. The several letters or characters to be applied upon each side of each slice of bread are preferably removably mounted in vertical alignment as indicated in Fig. 1, where it will be seen that provision is made for 4 letters or characters 28, 28', 28'' and 28''', the length or extent of the branding line being determined by the axial length of the branding wheel.

Another provision for insuring proper synchronization of the branding wheels, and which may render the sprocket wheel and chain connection unnecessary, are the registering wheels 43, 44, adapted to engage the recesses 45, 46 in the star wheels shown upon the same shafts with the sprocket wheels 29, 30. These wheels 43, 44 are pivotally mounted in arms 47, 48 which in turn are pivotally mounted at 49, 50, upon the carriages 14, 15, being retained in contact with the star wheels by the springs 51, 52, one end of each of which is secured to its carriage and the other to the arms 47 or 48. Slots 46' are provided in the star wheels 45, and screws 46'' are provided in the wheels 25, 26, so that to insure proper synchronization between the wheels 25, 26, the respective star wheels thereof may be set by and held by the binding screws 46'' and the branding type will thus mark each loaf at exactly the same place at opposite sides thereof.

Also upon the carriages 14, 15, are pivotally mounted the arms 53, 54, having a limit of movement between stops 55, 56, and 57, 58, the same being held normally in the direction of each other by the springs 59, 60, said arms being provided with bruhes 61, 62, adapted to ride upon the faces of the branding types such as 27, 28, thus insuring proper cleaning of the branding surfaces at all times, said brushes 61, 62, being pivotally mounted upon the arms 53, 54, at 63, 64, as shown.

Referring now more particularly to Figs. 4 to 5 inclusive, the loaves of bread 13, leave the branding machine from the conveyor 8, sliding down the chute 70, to the conveyor 71 of the cutting machine 72, where each loaf successively comes to rest upon the springs 73, 73', which allow the loaf to drop down upon the cutter conveyor 71, while it is moving at right angles to the branding conveyor 8, after which the loaf 13 passes to the slicing knives 74.

75' indicates a stop against which the loaf is fed before being released by the springs 73, 73', which may be resiliently projected pivoted fingers or levers, if desired, and which may be operated by any suitable means. 76 indicates fingers or holders upon the belt 71, for holding the bread in position thereon while being fed to the knives, and are narrow enough to pass between the knives, and the cutting machine is preferably positively connected to the branding machine in any suitable manner so that as each loaf drops from the latter upon the former, the fingers 76 are in position to engage and hold the same, thus insuring delivery of loaves to the cutters in such position that each cut is made between the brand marks and not through the same.

Of course it will be understood that various modifications may be made in the construction and arrangement of parts without departing from the spirit of the invention as claimed.

I claim:

1. In a marking device of the class described, a frame, markers rotatably mounted at opposite sides thereof, a movable endless conveyor between said markers adapted to engage and convey the articles to be marked between said markers, and means providing for the synchronous rotation of said markers, and in combination therewith means for automatically predetermining the relative position of rest of said markers independently of the feed of the same.

2. In a marking device of the class described, a frame, markers rotatably mounted at opposite sides thereof, a movable endless conveyor between said markers adapted to engage and convey the articles to be marked between said markers, and means providing for the synchronous rotation of said markers, said last mentioned means including means for automatically correcting when necessary the synchronization of said marking means.

HARRY M. SMALLEN.